(No Model.)

J. L. HOUSE.
AXLE LUBRICATOR.

No. 406,839. Patented July 9, 1889.

Witnesses:
Wm. G. Bell
H. E. Hadley

Inventor:
Joseph L. House

UNITED STATES PATENT OFFICE.

JOSEPH L. HOUSE, OF MINNEAPOLIS, MINNESOTA.

AXLE-LUBRICATOR.

SPECIFICATION forming part of Letters Patent No. 406,839, dated July 9, 1889.

Application filed February 25, 1889. Serial No. 300,788. (No model.)

*To all whom it may concern:*

Be it known that I, JOSEPH L. HOUSE, a citizen of the United States, residing at Minneapolis, in the county of Hennepin and State of Minnesota, have invented a new and useful Improvement in the Method of Lubricating the Axles of Wheeled Vehicles, of which the following is a full and clear description, reference being had to the accompanying drawings.

My invention relates to the method of lubricating the axles of wheeled vehicles both when the axles are made solid and when made tubular, and may under certain circumstances be applied to the axles or shafts of any moving machinery.

The objects of my invention are, first, to insure perfect lubrication of the axle at all times; second, to economize in the amount of lubricant used, and, third, to furnish a quick and easy method of replenishing the lubricant when exhausted. I accomplish these results by making an oil-reservoir within the axle and conveying the oil from this reservoir to the rubbing-surface by means of wicks, as clearly shown in the accompanying drawings, wherein similar letters refer to similar parts throughout.

Figure 1:
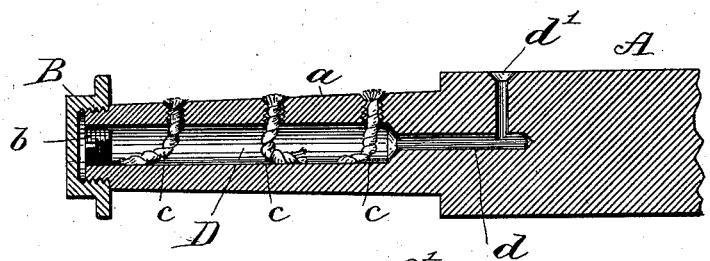
Figure 2:
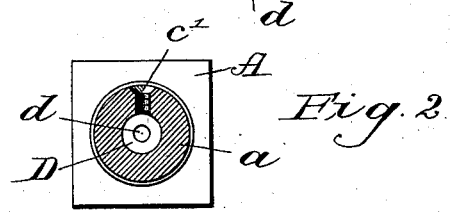
Figure 3:
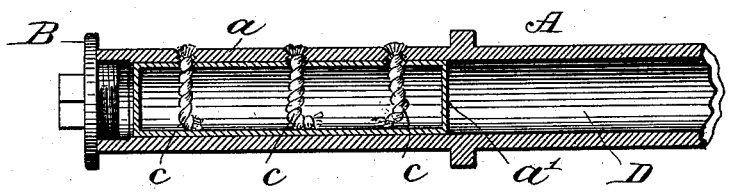
Figure 4:
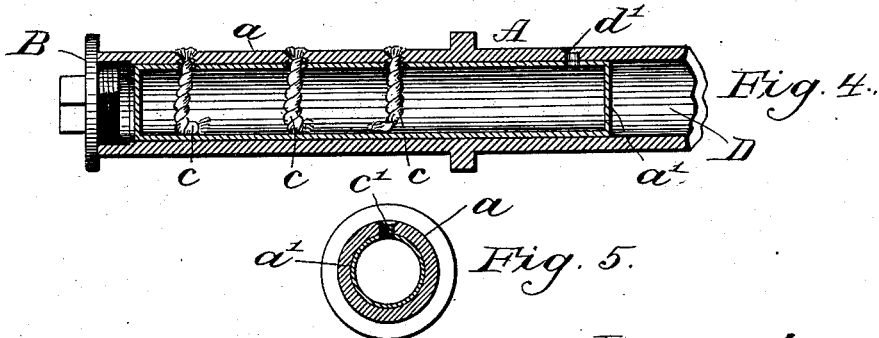
Figure 5:
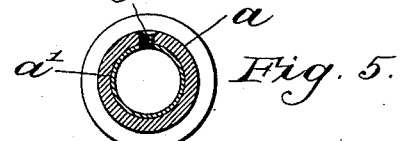

Figure 1 is a longitudinal vertical section of an ordinary solid wagon-axle, showing the oil-reservoir and wicks in position. Fig. 2 is a cross-section of Fig. 1, through one of the holes in which the wicks are inserted. Figs. 3 and 4 are longitudinal vertical sections through a tubular axle, showing different modes of making the internal oil-reservoir. Fig. 5 is a cross-section through either Fig. 3 or Fig. 4 on a line of one of the wicks.

A is the axle as a whole.
$a$ is the spindle or part on which the hub runs.

$a'$ is an internal can or reservoir for oil when a tubular axle is used.

B is the nut which holds the hub in place on the spindle.

D is an internal chamber in the axle, which is left in the manufacture of tubular axles, but which is drilled in the case of solid axles.

$d$ is an extension to D when the chamber has to be drilled.

$d'$ is an oil-hole drilled in the main part of the axle to meet the extension $d$.

$b$ is a plug used to close the end of hole D in solid axles.

$c'$ are countersunk and tapped holes through the spindle $a$ into the chamber D, and $c$ are wicks screwed into the holes $c'$.

In solid axles, as shown in Fig. 1, the hole D has a length less than the length of the spindle on which the hub runs, the necessary connection between it and the oil-hole $d'$ being made by a smaller hole $d$, the object of this being to avoid weakening the axle at the shoulder where the spindle joins the body of the axle.

The small holes $c'$, Fig. 2, might be left smooth on the inside; but I prefer to have a thread cut in them, as by so doing the wick will be held in place and cannot slip away from a contact with the interior of the hub.
The object in making a countersunk top to the holes $c'$ is to give a bushy top to the wick, while just below it is screwed comparatively tight into the hole.

In tubular axles I make the oil-chamber by inserting in the interior a small can or supplementary reservoir $a'$, Figs. 3, 4, and 5, having holes in it corresponding with the holes $c'$ in the axle. By this means the wicks, which are screwed into the holes $c'$, hold the can from moving endwise.

In Fig. 3 the can or reservoir $a'$ only extends far enough to accommodate the wicks. In this case the can $a'$ is refilled by removing the wheel, unscrewing one of the wicks, and filling through the hole from which the wick was removed. In Fig. 4 the can $a'$ has an extended form, so that the refilling may be done through the hole $d'$, back of the hub of the wheel.

It will be readily understood that the can $a'$ is not an absolute necessity in my method of lubricating axles, as I can plug both ends of the hollow axle and fill the whole interior with oil. My object in using the supplementary can $a'$ is to provide a small reservoir that will not require so much oil to fill, but which will contain an ample supply for all necessary work.

The operation of my device is as follows:
Having filled the reservoir with oil and screwed the wicks down into it, the capillarity of the wicks conveys the oil to the upper end, but does not let it overflow. When the wheel is running, the inside of the hub rubs on the saturated upper end of the wicks, and has a certain amount of lubricant conveyed to its surface. This amount is sufficient to keep the bearing lubricated as long as the supply of oil is kept up. When the wheel stops, the rubbing action on the bushy and saturated end of the wick ceases, and consequently no oil is wasted at a time when it is not needed.

I am aware that internal oil-chambers have been used in connection with the lubrication of journals, and therefore do not claim such a chamber, broadly; but What I do claim, and wish to secure by Letters Patent, is—

1. In the axles of wheeled vehicles, the combination of a drilled and plugged oil-reservoir in the end of said axle, one or more transverse countersunk holes communicating between said reservoir and the bearing-surface of said axle, and screw-threads in said transverse holes, whereby the wicks for conveying the oil through said holes may be adjusted and securely held in any desired position, substantially as and for the purpose set forth.

2. In combination, the axle of a wheeled vehicle, the drilled and plugged hole D in the end of said axle, the smaller hole $d$, extending beyond the end of D, the oil-hole $d'$, drilled in the body of the axle back of the bearing and communicating with $d$, the countersunk holes $c'$, the wicks $c$, passing through said holes $c'$, and screw-threads in said holes $c'$, substantially as and for the purpose set forth.

3. In wheeled vehicles, the combination of a tubular axle A, having tapped and countersunk holes $c'$, an internal can or oil-reservoir $a'$, having holes to correspond to holes $c'$, and wicks screwed into said holes $c'$ for the double purpose of holding said oil-can in place and conveying the oil from said can to the interior of the hub of the wheel by the capillary action of said wicks, all substantially as and for the purpose specified.

4. In wheeled vehicles, the combination of a tubular axle A, having countersunk and tapped holes $c'$ in the bearing of said axle and an oil-hole $d'$ back of said bearing, an internal oil-can $a'$, having holes to correspond to holes $c'$ and $d'$ in said axle, and wicks screwed into said holes $c'$ and extending down into said oil-can, substantially as and for the purpose specified.

JOSEPH L. HOUSE.

Witnesses:
J. W. ROBBINS,
J. H. KEHOE.